United States Patent [19]
Maekawa

[11] Patent Number: 6,164,785
[45] Date of Patent: *Dec. 26, 2000

[54] ANTIGLARING FILM

[75] Inventor: Tomoyuki Maekawa, Shinjuku-Ku, Japan

[73] Assignee: Dai Nippon Printing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/887,249

[22] Filed: Jul. 2, 1997

[30] Foreign Application Priority Data

Jul. 5, 1996 [JP] Japan .................................. 8-194133

[51] Int. Cl.[7] .................................................. G02B 27/00
[52] U.S. Cl. ............................ 359/613; 359/601; 359/614
[58] Field of Search .................................. 359/601, 613, 359/614, 615, 599

[56] References Cited

U.S. PATENT DOCUMENTS 4,690,987   9/1987   Sakakibara et al. .................... 525/502
4,734,295   3/1988   Liu .............................................. 427/64
5,773,126   6/1998   Noritake et al. ......................... 359/601

FOREIGN PATENT DOCUMENTS

WO96/19343   6/1996   Japan .

*Primary Examiner*—Thong Nguyen
*Assistant Examiner*—Euncha Cherry
*Attorney, Agent, or Firm*—Parkhurst & Wendel, L.L.P.

[57] ABSTRACT

The present invention is to provide an antiglaring film 10 which can maintain images clear and does not cause the scintillation of images even when placed on a high definition display with a large number of pixels. The antiglaring film is characterized in that an antiglaring layer 1 comprising a curable resin and transparent particles having an average particle diameter of 0.5 to 1.5 micrometers, the amount of the transparent particles being from 20 to 30 parts by weight for 100 parts by weight of the curable resin is formed on a substrate film 1.

5 Claims, 1 Drawing Sheet

ANTIGLARING FILM

BACKGROUND OF THE INVENTION

The present invention relates to an antiglaring film to be placed on the surfaces of a variety of image-displaying CRTs and LCDs for word processors, computers, televisions, etc., especially on the surfaces of displays useful for displaying high definition images.

BACKGROUND ART

Heretofore, a glass- or plastic-made transparent protective substrate having thereon an antiglaring layer (an antiglaring film) has been placed on the surfaces of a variety of displays for word processors, computers, televisions and the like, thereby improving the visibility of visual information such as letters and figures.

As an antiglaring film of this type, a film on which an antiglaring layer containing fine particles such as silica or resin beads is provided has been used to diffuse light to some extent so as to protect glaring which is caused when light from the inside of the display is visually observed at the surface thereof.

However, the antiglaring film having an antiglaring layer containing the above-described fine particles has such a problem that, when it is placed on the display of a high definition television or on a display with a large number of pixels, the images displayed on the display flicker or become unclear.

The conventional antiglaring film has been provided on the surface of a display by means of an antiglaring treatment for the purpose of diffusing, to some extent, light emitted from the inside of the display in order to prevent the scope of the display from glaring, which is caused when light emitted from the inside of the display passes through the surface of the display without being diffused on the same. This antiglaring treatment has been carried out by coating, onto the surface of a display, a coating liquid prepared by dispersing fine particles such as silica or resin beads in a binder, or by adhering, to the surface of a display, a coated film obtained from the coating liquid.

In the case of an antiglaring film composed of a transparent film, and an antiglaring layer provided thereon, made from a resin composition containing fine particles such as amorphous silica, when the fine particles are incorporated into the antiglaring layer in such an amount that the antiglaring film can show satisfactorily excellent antiglaring properties, the transparency of the film is impaired, and the haze value (diffuse transmittance/total light transmittance) of the film is increased. As a result, the antiglaring film undergoes deterioration not only in optical properties such as resolving power, contrast and transparency but also in physical properties such as resistance to scratching.

In order to overcome the above shortcomings, there has been disclosed the use of a polarizing plate having the function of preventing glaring, in which a cured layer is formed by the use of a composition containing an ultraviolet-light-curable polyester acrylate resin and cohesive silica gel (see Japanese Patent Publication No. 40282/1988).

However, although the antiglaring layer made from cohesive silica gel and an ultraviolet-light-curable polyester acrylate resin has hardness high enough for showing improved resistance to scratching, it is poor in antiglaring effect.

Further, the conventional antiglaring film having an antiglaring layer which contains large-sized particles has such a problem that, when it is placed on the display of a high definition television or on a display with a large number of pixels, the images on the display flicker, and the resolving power is lowered, so that the images become unclear. The present invention was accomplished in view of the aforementioned problems in the prior art. An object of the present invention is therefore to provide an antiglaring film which does not adversely affect displayed images even when the film is placed on a high definition display.

DISCLOSURE OF THE INVENTION

In order to attain the above object, the present invention provides an antiglaring film comprising a substrate film, and an antiglaring layer provided thereon, in which the antiglaring layer comprises a curable resin, and transparent particles having an average particle diameter of 0.5 to 1.5 micrometers, the amount of the transparent particles being from 20 to 30 parts by weight for 100 parts by weight of the curable resin. According to the present invention, there can be obtained an antiglaring film which can give such image visibility that the sum of the distinctness of image (image visibility) respectively measured by using four types of optical combs defined in JIS K7105 is 200% or more and whose antiglaring layer has a 60-degree specular glossiness of 90% or less.

Further, according to a preferred embodiment of the present invention, the curable resin contained in the antiglaring layer is a cured product obtained by irradiating the curable resin with ionizing radiation in an atmosphere whose oxygen content is 1,000 ppm or less.

Furthermore, in a preferred embodiment of the present invention, the transparent particles has an average secondary particle diameter of 1.0 to 1.5 micrometers, and a particle size distribution with a standard deviation of 0.6 micrometers of less.

BEST MODE FOR CARRYING OUT THE INVENTION

Figure 1:
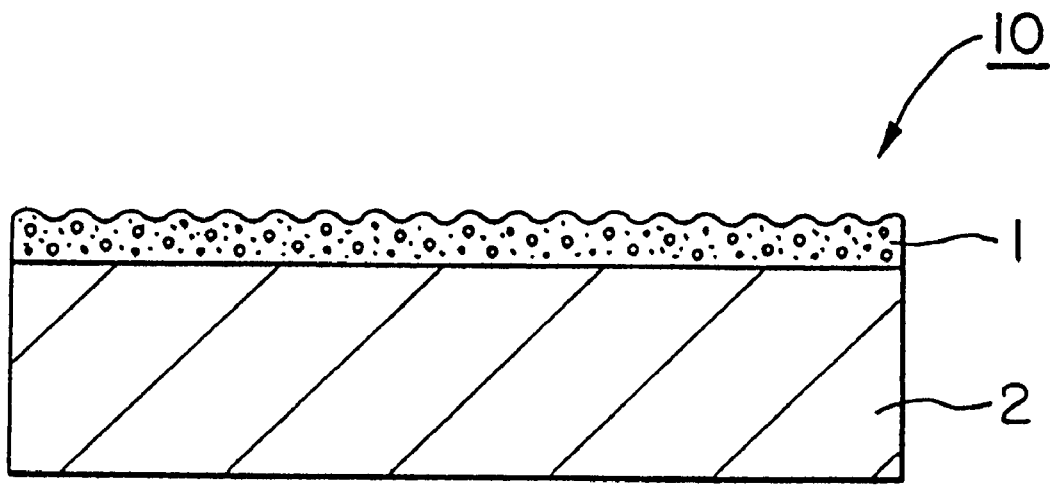
FIG. 1 is a diagrammatical sectional view illustrating the concept of an antiglaring film of the present invention.

As shown in FIG. 1, an antiglaring film 10 of the present invention comprises a substrate film 2, and an antiglaring film 1 formed thereon. The antiglaring film 1 comprises a curable resin, and transparent particles having an average particle diameter of 0.5 to 1.5 micrometers, the amount of the transparent particles being from 20 to 30 parts by weight for 100 parts by weight of the curable resin.

The substrate film for use in the present invention can be properly selected depending upon the strength required for the resulting antiglaring film, and the post-treatment and post-processing to be carried out. However, when the feature of antiglaring films is taken into consideration, the substrate film is selected from materials which are superior to ordinary plastics in transparency. Preferable examples of the substrate film include oriented or unoriented films of polyethylene terephthalate, polybutylene terephthalate, polyamides (nylon 6, nylon 66), triacetyl cellulose, polystyrene, polyacrylates, polycarbonates, polyvinyl chloride, polymethyl pentene, polyether sulfones, polymethyl methacrylate, and the like. These films can be used either singly or as a multi-layer film consisting of two or more of the films.

The thickness of the substrate film is preferably in the range of 10 to 100 micrometers. When the substrate film has a thickness in this range, the post-processing characteristics thereof are not adversely affected. To use a substrate film having a thickness more than 100 micrometers is waste of resources. Moreover, it is sometimes difficult to handle such a substrate film during processing.

The transparent particles which are incorporated into the antiglaring layer so as to impart thereto antiglaring properties are those of silica, aluminum hydroxide, acrylic beads or the like, and those having an average particle diameter of 0.5 to 1.5 micrometers can be preferably used.

In the present invention, besides the above-described transparent particles, resin beads of polycarbonates, polystyrene, acrylate-styrene copolymers or the like, having an average particle diameter of 2 to 10 micrometers can also be additionally incorporated into the antiglaring layer in order to impart thereto smoothness.

Transparent particles having an average particle diameter smaller than 0.5 micrometers cannot fully impart, to the antiglaring layer, antiglaring properties, the object of the present invention. On the other hand, transparent particles having an average particle diameter larger than 1.5 micrometers are unfavorable because such particles sometimes become the cause of the scintillation of images displayed on a high definition display. In the present invention, the term "average particle diameter" means the average diameter of secondary particles, that is, "average secondary particle diameter". Further, in the present invention, a particle diameter is an arithmetic diameter obtained from weight distribution. The average primary particle diameter of the transparent particles for use in the present invention is approximately 10 to 20 nm.

In a more preferable embodiment of the present invention, transparent particles having an average secondary particle diameter of 1.0 to 1.5 micrometers, and a weight-based particle size distribution with a standard deviation of 0.6 micrometers or less can be preferably used. When transparent particles having a particle size distribution with a standard deviation in excess of 0.6 micrometers are used, it is difficult to obtain optical properties suitable for antiglaring films, which will be described later.

In the present invention, the antiglaring film is evaluated by measuring the distinctness of image by a measuring apparatus described in JIS K7105(1981), using optical combs having widths of 2 mm, 1 mm, 0.5 mm and 0.125 mm. Namely, the distinctness of image corresponding to the image visibility of a high definition image (the dot pitch of a high definition display: 180 micrometers or less) is measured by using an optical comb having a width of 0.125 mm; the distinctness of image is measured by using optical combs having widths of 2 mm, 1 mm and 0.5 mm respectively; the sum total of these four distinctness of image values is obtained by calculation; and the applicability of the antiglaring film to high definition displays is judged from this sum total obtained.

We have found the following: when the average secondary particle diameter of the transparent particles to be used for imparting antiglaring properties lies in the range of 0.5 to 1.5 micrometers, the distinctness of image corresponding to the comb width of 0.125 mm is 50% or more; on the contrary, when the above average particle diameter is in excess of the above-described range, the distinctness of image cannot reach to 10%.

Not only a thermosetting resin but also an ionizing-radiation-curable resin can be used as the curable resin for binding the transparent particles.

As the ionizing-radiation-curable resin which can be used in the present invention, a composition obtainable by properly mixing a reactive prepolymer, oligomer and/or monomer having, in the molecule thereof, a polymerizable unsaturated bond or epoxy group is preferably used. Further, a thermoplastic resin such as a urethane, polyester, acrylic, butyral or vinyl resin can be used, when necessary, along with the ionizing-radiation-curable resin.

Examples of the prepolymer or oligomer include polyfunctional urethane acrylate, urethane methacrylate (in this specification, acrylate and/or methacrylate is hereinafter expressed by (meth)acrylate), alkyl (meth)acrylates, polyester (meth)acrylates, epoxy (meth)acrylate, and siloxanes.

Further, as the prepolymer or oligomer, there can also be mentioned unsaturated polyesters which are condensation products between unsaturated dicarboxylic acids and polyhydric alcohols.

Examples of the monomer include vinyl benzene monomers such as styrene and alpha-methylstyrene, methyl (meth)acrylate, ethyl (meth)acrylate, butyl (meth)acrylate, 2-ethylhexyl (meth)acrylate, methoxyethyl (meth)acrylate, butoxyethyl (meth)acrylate and phenyl (meth)acrylate.

There can also be mentioned unsaturated carboxylic acid amides such as (meth)acrylamide, and esters of unsaturated carboxylic acids and glycols, such as ethylene glycol di(meth)acrylate, propylene glycol di(meth)acrylate, neopentyl glycol di(meth)acrylate, 1,6-hexanediol di(meth) acrylate and triethylene glycol di(meth)acrylate.

There can further be mentioned polyfunctional compounds such as dipropylene glycol di(meth)acrylate, ethylene glycol di(meth)acrylate, propylene glycol di(meth) acrylate and pentaerythritol tri(meth)acrylate.

There can still further be mentioned polythiol compounds having, in the molecule thereof, two or more thiol groups, such as trimethylolpropane trithioglycolate, trimethylolpropane trithiopropiolate and pentaerythritol tetrathioglycolate. The above-described compounds are used either singly or as a mixture of two or more. However, in order to impart normal processability to the resulting resin composition, it is preferable to use 5% by weight or more of the previously-mentioned prepolymer or oligomer, and 95% by weight or less of the above-described monomer and/or polythiol.

When a cured product having flexibility is required, the amount of the monomer used is made as small as possible within such a limit that the processability of the resulting composition is not adversely affected, and the degree of crosslinking of the cured product is made relatively low by using a mono- or di-functional acrylate monomer.

Further, when a cured product having heat resistance, hardness and solvent resistance is required, it is preferable to make the amount of the monomer used large within such a limit that the processability of the resulting composition is not adversely affected, or to make the degree of crosslinking of the cured product high by the use of a tri- or higher functional (meth)acrylate monomer.

Namely, the processability of the composition and the physical properties of the cured product are controlled by properly mixing a mono- or di-functional monomer with a trifunctional one.

Examples of the monofunctional monomer include 2-ethylhexyl acrylate, 2-hydroxyhexyl acrylate and phenoxyethyl acrylate.

Examples of the difunctional acrylate monomer include ethylene glycol di(meth)acrylate and 1,6-hexanediol diacrylate. Examples of the tri- or higher functional acrylate monomer include trimethylolpropane tri(meth)acrylate, pentaerythritol tri(meth)acrylate, dipentaerythritol penta(meth) acrylate and dipentaerythritol hexa (meth) acrylate.

In order to control the physical properties, such as flexibility and surface hardness, of the cured product, it is possible to incorporate an ionizing-radiation-uncurable resin and/or thermoplastic resin in an amount of 1 to 70% by weight, preferably 5 to 50% by weight for at least one prepolymer or oligomer mentioned previously.

Examples of the ionizing-radiation-uncurable resin include polyurethane, cellulose derivatives, polyesters, acrylic resins, polyvinyl butyral, polyvinyl chloride, polyvinyl acetate, polycarbonates and polyamides. In particular, polyurethane, cellulose derivatives, polyesters and polyvinyl butyral are preferred in order to obtain flexibility.

In order to harden an ionizing-radiation-curable resin by the irradiation of ultraviolet light, a photopolymerization initiator is added to an ionizing-radiation-curable resin composition.

As the photopolymerization initiator, a mixture of acetophenones, benzophenones, Michler's benzoinbenzoate, aldoxime, tetramethylthiuram monosulfide, thioxanetone and/or photosensitizers such as n-butylamine, triethylamine and tri-n-butylphosphine can be used.

The ionizing-radiation-curable resin composition contains a photoinitiator and a photopolymerizable monomer or oligomer which generate free radical when irradiated with ultraviolet or visible light having a wavelength of 180 nm or longer, or a photopolymerizable monomer or oligomer which generates free radical when irradiated with electron beam with an energy of 100 KeV to 106 KeV.

Examples of the photoinitiator which generates free radical when irradiated with ultraviolet or visible light having a wavelength of 180 nm or longer include radical polymerization initiators of intramolecular bond cleavage type such as benzoisobutyl ether, benzyl dimethyl ketal, diethoxy acetophenone, acyloxime esters, chlorinated acetophenone, hydroxy acetophenone, acylphosphone oxide, glyoxylic esters and cyclic benzyl; radical polymerization initiators of intermolecular hydrogen abstraction type such as benzophenone, Michler's ketone, dibenzosuberone, 2-ethylanthraquinone, isobutyl thioxanthone, benzyl and 3-ketomaclurin; dicarbonyl radical polymerization initiators for visible light curing such as camphorquinone, anthraquinone, alpha-naphtyl, acenaphthene, p,p'-dimethoxybenzyl and p,p'-dichlorobenzyl; thioxanthone radical polymerization initiators for visible light curing such as 2-chlorothioxanthone, 2-methylthioxanthone, 2,4-dimethyl-thioxanthone and 2,4-diethylthioxanthone; acylphosphone oxide radical polymerization initiators for visible light curing such as 2,4,6-trimethylbenzoyldiphenylphosphone oxide (TMDPO) and 2,6-dimethylbenzoylphosphone oxide; and radical polymerization initiators for visible light curing such as "Cantor Cure PDO" and "Eosin Y". In addition, there can also be mentioned water-soluble photoinitiators such as 4-(2-hydroxyethoxy)phenyl-(2-hydroxy-2-propyl)ketone, and copolymerizable photoinitiators such as alpha-allylbenzoin, alpha-allylbenzoin aryl ether and benzophenone derivatives.

Examples of the aliphatic polyfunctional acrylate include alkyl-type acrylates such as 1,4-butanediol diacrylate, neopentylglycol diacrylate and 1,6-hexanediol diacrylate; alkylene-glycol-type acrylates such as diethylene glycol diacrylate, triethylene glycol diacrylate, polyethylene glycol 400 diacrylate and tripropylene glycol diacrylate; ester-type acrylates such as hydroxypivalate and neopentyl glycol diacrylate; trimethylolpropane-type acrylates such as trimethylolpropane triacrylate and ethoxylated trimethylolpropane tetraacrylate; pentaerythritol-type acrylates such as pentaerythritol triacrylate and dipentaerythritol hexaacrylate; isocyanurate-type acrylates such as tris(acryloxyethyl) isocyanurate; and alicyclic-type acrylates such as dicyclopentanyl diacrylate and ethoxylated hydrogenated bisphenol A diacrylate.

Examples of the aromatic monofunctional acrylate include phenyl-type acrylates such as phenyl acrylate; benzyl-type acrylates such as benzyl acrylate; and phenoxy-type acrylates such as phenoxydiethylene glycol acrylate and nonylphenoxy-polyethylene glycol acrylate. Examples of the aromatic polyfunctional acrylate include bisphenol-A-type acrylates such as ethoxylated bisphenol A diacrylate, ethoxylated bisphenol F diacrylate and ethoxylated bisphenol S diacrylate.

Examples of the OH-containing acrylate include alcohol-type acrylates such as 2-hydroxyethyl acrylate, 2-hydroxyethyl methacrylate, 2-hydroxypropyl acrylate and hydroxydiethylene glycol methacrylate; epoxy-type acrylates such as butoxyhydroxypropyl acrylate, phenoxyhydroxypropyl acrylate, hydroxypropyl dimethacrylate, diethylene glycol bis(hydroxypropylacrylate); epoxy-type acrylates such as propoxylated bisphenol A bis (hydroxyfluoropropylacrylate); trimethylolpropane-type acrylates such as hydroxypropylated trimethylolpropane triacrylate; and pentaerythritol-type acrylates such as monohydroxypentaerythritol triacrylate. Allyl acrylate can be mentioned as the acrylate having allyl group.

The ratio between the photoinitiator and the photopolymerizable monomer or oligomer which generate free radical when irradiated with ultraviolet or visible light can be determined depending upon the intensity of ultraviolet or visible light to be applied, temperature and humidity. In general, it is preferable that the photoinitiator be used in an amount of 1 to 20 parts by weight for 100 parts by weight of the resin component, that is, the photopolymerizable monomer or oligomer.

As the ionizing-radiation-curable resin for use in the present invention, a photopolymerizable monomer or oligomer which generates free radical when irradiated with electron beam with an energy of 100 KeV to 106 KeV is preferred.

The photopolymerizable monomer or oligomer for use in an electron-beam-curable resin composition is the above-described photopolymerizable monomer or oligomer which generates free radical when irradiated with ultraviolet or visible light. In the present invention, the term "ionizing radiation" means electromagnetic wave or charged particles having an energy quantum with which molecules can be polymerized and crosslinked. In general, ultraviolet light or electron beam is used as the ionizing radiation.

It is possible to cure the ionizing-radiation-curable resin by an ordinary method for curing ionizing-radiation-curable resin compositions. For instance, in the case of electron beam curing, energy emitted from an electron beam accelerator of Cockcroft-Walton type, van de Graaff type, dynamitron type, resonance transformation type, insulation core transformer type, linear type or high-frequency type is applied to an object to excite or ionize the molecule thereof, thereby causing chemical reaction. Although electron beam with an accelerating voltage ranging from 50 to 3,000 KeV can be used, electron beam with an accelerating voltage of 150 to 300 KeV is preferred.

It is preferable to incorporate a leveling agent into a coating liquid for forming the antiglaring layer in order to level the surface thereof. In the case of a composition which contains a solvent at the time when it is being coated and which is cured by means of ionizing radiation irradiation after coated and dried, the leveling can be improved by the action of the solvent in which a binder is dissolved. However, when an ionizing-radiation-curable resin is cured, the addition of a fluorine or silicone leveling agent to a coating liquid is advantageous for the curing of the resin. In particular, when triacetyl cellulose excellent in optical properties is used as the substrate film, there may be a case where the antiglaring layer cannot be fully cured since the intensity of irradiation of ultraviolet light cannot be increased because the substrate film has no heat resistance. A coating liquid comprising an ionizing-radiation-curable resin and the above-described leveling agent is advantageous in that the fluorine or silicone leveling agent separated out, after the coating liquid is coated and dried, on the surface of the coated film, that is, on the interface between the coated film and the air not only prevents the coated film from being cured imperfectly due to oxygen, but also imparts, as a lubricant, resistance to scratching to the coated film.

It is preferable to incorporate an antistatic agent into the antiglaring layer in order to protect the antiglaring layer from dusts. There can be mentioned a variety of surface active agents as materials for imparting antistatic properties. However, they show their effects when separated out on the surface of a coated film, so that sustaining antistatic effect cannot be expected.

Generally used is a composition comprising a crosslinking antistatic agent which contains an electrically-conductive material selected from powders of various metals such as silver, copper and nickel, and powders or flakes of carbon black and tin oxide, an acrylic ester having quaternary ammonium base, and a (meth)acrylate copolymer.

In particular, tin oxide is good in transparency. When tin oxide particles having diameters between 0.05 to 0.1 micrometers are used, it is possible to minimize the increase of the haze value of the antiglaring layer.

The antiglaring layer of the present invention is formed by coating, onto the substrate film, a coating liquid having a suitable viscosity, prepared by dissolving a resin composition selected from the previously-mentioned resins in a proper solvent, and curing the coated film. The coating liquid is coated by a conventional method such as reverse, roll, bar or gravure coating method in an amount of 3 to 15 g/m2 (based on the solid matter, the same shall apply hereinafter), and the solvent is removed by drying. Thereafter, curing reaction is carried out by applying electron beam or electromagnetic wave such as ultraviolet or visible light. To cure the coated film by the irradiation of ultraviolet light, electromagnetic wave emitted from ultrahigh-pressure mercury vapor lamp, high-pressure mercury vapor lamp, carbon arc, xenon arc, metal halide lamp or the like can be utilized.

It is preferable to allow the curing reaction caused by the irradiation of ionizing radiation to proceed in an atmosphere containing a minimum amount of oxygen. When the curing reaction is carried out in a low-oxygen-content atmosphere, the reaction can be completed without bringing about imperfect curing due to oxygen, or coloring or decomposition due to side reaction except the desired polymerization reaction. The antiglaring layer can thus maintain abrasion resistance, firmly holding particles contained therein. On the contrary, when the curing reaction is carried out in a high-oxygen-content atmosphere, the reaction cannot be completed. Therefore, the resulting antiglaring layer is poor in abrasion resistance, and the particles contained in the antiglaring layer can fall off. The oxygen content is preferably 1,000 ppm or lower.

In order to obtain high and stable adhesion between the substrate film and the antiglaring layer, it is preferable to treat, by means of corona discharge or with ozone gas, the surface of the substrate film onto which the coating liquid is coated, or to provide a primer layer made from a material having high adhesiveness, compatible with both the surface of the substrate film and that of the antiglaring layer.

The primer layer can be formed by coating a reactive varnish consisting of polyester-polyol or polyether-polyol and polyisocyanate in an amount of 0.5 to 2 g/m2.

EXAMPLE 1

A triacetyl cellulose film having a thickness of 80 micrometers was used as the substrate film 2 shown in FIG. 1. Onto one surface of this substrate film, a coating liquid for forming an antiglaring layer, having the following composition was coated by means of bar coating in an amount of 5 g/m2. After the solvent was evaporated, the coated film was irradiated twice with ultraviolet light in an atmosphere whose oxygen content was maintained at 0.1% or lower, at a rate of 10 m/min by using an ultraviolet light irradiator of 80 W/cm, thereby forming a cured antiglaring layer 1. An antiglaring film 10 of Example 1 was thus obtained.

| Coating Liquid for Forming Antiglaring Layer | |
|---|---|
| Pentaerythritol triacrylate | 50 parts by weight |
| Irgacure 184 (photopolymerization initiator) | 2 parts by weight |
| Silicone (leveling agent) | 1 part by weight |
| Silica (average secondary particle diameter = 1.092 micrometers, standard deviation = 0.485 micrometers) | 12 parts by weight |
| Toluene | 34 parts by weight |

COMPARATIVE EXAMPLE 1

The procedure of the above Example was repeated except that the amount of silica to be incorporated into the coating liquid was changed to 18 parts by weight, thereby curing the antiglaring layer to obtain an antiglaring film 10 of Comparative Example 1.

COMPARATIVE EXAMPLE 2

The procedure of the above Example 1 was repeated except that silica particles having an average secondary particle diameter of 1.369 micrometers and a particle size distribution with a standard deviation of 0.796 micrometers were used, thereby curing the antiglaring layer to obtain an antiglaring film 10 of Comparative Example 2.

COMPARATIVE EXAMPLE 3

The procedure of the above Example was repeated except that silica particles having an average secondary particle diameter of 2.669 micrometers and a particle size distribution with a standard deviation of 1.139 micrometers were used, thereby curing the antiglaring layer to obtain an antiglaring film 10 of Comparative Example 3.

REFERENTIAL EXAMPLE 1

The procedure of Example 1 was repeated except that the curing of the antiglaring layer by the irradiation of ultraviolet light was conducted in the air, thereby preparing an antiglaring film 10 of Referential Example 1.

The antiglaring films of the above Example, Comparative Examples and Referential Example were evaluated, and the results are shown in the below Table 1. The evaluation was carried out in terms of the following items in accordance with the following methods.

(1) Distinctness of Image

In accordance with the method for evaluating distinctness of image described in JIS K7105(1981), the distinctness of image was measured by an "Image visibility Meter ICM-IDP" manufactured by Suga Test Instruments Co., Ltd., Japan, through optical combs having widths of 2 mm, 1 mm, 0.5 mm and 0.125 mm. The degree of image visibility measured through an optical comb having a width of 0.125 mm, corresponding to the definition of a high definition image, and the distinctness of image respectively measured through optical combs having widths of 2 mm, 1 mm and 0.5 mm were compared for evaluation.

(2) Glossiness

In accordance with the method for measuring gloss described in JIS K7105-1981, the 60-degree specular glossiness was measured by a "Gloss Meter GM-3D" manufactured by Murakami Color Research Laboratory, Japan.

(3) Scintillation

The antiglaring film was adhered to the surface of a display for displaying high definition images with a dot pitch of 180 micrometers, and the condition of the image was visually observed.

Evaluation standard:

O: Scintillation of the image is not obserbed, good; and

X: Scintillation of the image is observed.

(4) Antireflection Effect

The surface of the antiglaring layer was irradiated with light emitted from a fluorescent tube of 40 W, and the degree of light reflected at the surface was visually observed.

Evaluation standard:

O: The light emitted from the fluorescent tube is prevented from being reflected, good; and X: The light emitted from the fluorescent tube is greatly reflected.

(5) Abrasion Resistance Test

A film specimen on which the antiglaring layer was formed was dipped in an alkali solution (2 N NaoH) at 60° C. for 120 seconds. The specimen was taken out from the solution, washed with running water, and then dried. Thereafter, the surface of the antiglaring layer was rubbed reciprocatingly 10 times with cloth (trade name "Bencot" manufactured by ASAHI CHEMICAL CORP.), and the condition of the particles contained in the antiglaring layer was visually observed.

Evaluation standard:

O: The particles are free from falling off, good; and

X: The particles have been considerably fallen off.

TABLE 1

(Results of the Evaluation of Antiglaring Films)

| Evaluation Item | Example 1 | Comp. Example 1 | Comp. Example 2 | Comp. Example 3 | Referential Example 1 |
|---|---|---|---|---|---|
| Distinctness of Image (%) (Optical Comb) | | | | | |
| 0.125 mm | 62 | 68 | 23 | 6 | 62 |
| 0.5 mm | 59 | 65 | 20 | 4 | 58 |
| 1.0 mm | 58 | 68 | 24 | 8 | 59 |
| 2.0 mm | 66 | 84 | 51 | 44 | 71 |
| Sum of Distinctness of Image | 245 | 285 | 118 | 62 | 250 |
| 60-degree specular glossiness (%) | 60 | 105 | 40 | 85 | 62 |
| Scintillation | | | | | |
| Dot pitches 180 μm | O | O | x | O | O |
| Antireflection effect | O | x | O | O | O |
| Abrasion resistance | O | O | O | O | x |

As can be known from the above results, the antiglaring film according to the present invention can give such image definition that the distinctness of image measured through an optical comb having a width of 0.125 mm is 50% or more and that the sum of the distinctness of image measured through four types of optical combs is 200% or more. The present invention can thus provide an antiglaring film having a glossiness of 60% or less, showing antiglaring properties, useful for high definition displays.

Further, the antiglaring layer obtained by allowing the curable resin to react in a low-oxygen-content atmosphere is superior to the antiglaring layer (Referential Example 1) obtained by allowing the curable resin to react in the air in abrasion resistance and durability.

I claim:

1. An antiglaring film comprising:

a substrate film; and an antiglaring layer formed thereon, wherein the antiglaring layer comprises a curable resin and transparent particles, said transparent particles having an average primary particle diameter of 10 to 20 nm and an average secondary particle diameter of 0.5 to 1.5 micrometers and a weight based particle size distribution with a standard deviation of 0.6 micrometers or less, the amount of the transparent particles being from 20 to 30 parts by weight for 100 parts by weight of the curable resin, wherein (1) said antiglaring film has an image visibility characterized in that the sum of the distinctness of image measured through four types of optical combs defined in JIS K 7105 is at least 200% and (2) said antiglaring layer has a 60-degree specular glossiness not exceeding 90%.

2. The antiglaring film according to claim 1, wherein the curable resin contained in the antiglaring layer is a cured product obtained by irradiating the curable resin with ionizing radiation in an atmosphere whose oxygen content is 1,000 ppm or less.

3. The antiglaring film according to claim 1, wherein the transparent particles are silica particles or acrylic beads.

4. The antiglaring film according to claim 1, wherein the antiglaring layer contains a leveling agent.

5. The antiglaring film according to claim 1, wherein the antiglaring layer contains an antistatic agent.

* * * * *